US009258786B2

(12) United States Patent
Cao et al.

(10) Patent No.: US 9,258,786 B2
(45) Date of Patent: Feb. 9, 2016

(54) METHODS AND APPARATUS FOR USING A GEOMETRY INDICATOR IN HETNET DEPLOYMENTS

(71) Applicant: ZTE Wistron Telecom AB, Stockholm (SE)

(72) Inventors: Aijun Cao, Stockholm (SE); Yonghong Gao, Stockholm (SE); Jan Johansson, Norrfjärden (SE); Patrick Svedman, Stockholm (SE); Thorsten Schier, Stockholm (SE); Bojidar Hadjiski, Stockholm (SE)

(73) Assignee: ZTE Wistron Telecom AB, Stockholm (SE)

( * ) Notice: Subject to any disclaimer, the term of this patent is extended or adjusted under 35 U.S.C. 154(b) by 205 days.

(21) Appl. No.: 14/014,218

(22) Filed: Aug. 29, 2013

(65) Prior Publication Data

US 2014/0064211 A1    Mar. 6, 2014

(30) Foreign Application Priority Data

Aug. 30, 2012  (WO) ............... PCT/CN2012/080802

(51) Int. Cl.
*H04W 52/24* (2009.01)
*H04W 52/32* (2009.01)
*H04W 52/50* (2009.01)

(52) U.S. Cl.
CPC .......... *H04W 52/242* (2013.01); *H04W 52/244* (2013.01); *H04W 52/325* (2013.01); *H04W 52/50* (2013.01); *Y02B 60/50* (2013.01)

(58) Field of Classification Search
CPC .................................................... H04W 52/24
See application file for complete search history.

(56) References Cited

U.S. PATENT DOCUMENTS

| 2010/0182903 | A1* | 7/2010 | Palanki et al. ................ 370/225 |
| 2012/0046026 | A1* | 2/2012 | Chande et al. ............. 455/422.1 |
| 2012/0142334 | A1  | 6/2012 | Sato et al. |
| 2012/0188897 | A1* | 7/2012 | Shen ............................. 370/252 |
| 2012/0213109 | A1* | 8/2012 | Xu et al. ....................... 370/252 |
| 2013/0210431 | A1  | 8/2013 | Abe et al. |
| 2013/0265981 | A1* | 10/2013 | Yang et al. .................... 370/329 |

(Continued)

FOREIGN PATENT DOCUMENTS

| EP | 2 448 338 A1 | 5/2012 |
| EP | 2 523 510 A1 | 11/2012 |

(Continued)

OTHER PUBLICATIONS

3rd Generation Partnership Project, "Technical Specification Group Radio Access Network; Physical layer procedures (FDD) (Release 11)" 3GPP TS 25.214 V11.2.0, Jun. 2012.*

(Continued)

*Primary Examiner* — Robert M Morlan
(74) *Attorney, Agent, or Firm* — Perkins Coie LLP

(57) ABSTRACT

In a heterogeneous network deployment that includes a macro base station and a low power node, a geometry indicator is transmitted by the low power node to facilitate the calculation of a path loss difference value at a user equipment using power estimates of the received synchronization signal from the macro base station and received geometry indicator signal from the low power node. Using the estimated path loss difference value, the user equipment adjusts the power level of an initial preamble signal transmission to the macro base station.

8 Claims, 6 Drawing Sheets

(56) References Cited

U.S. PATENT DOCUMENTS

2014/0119264 A1* 5/2014 Shauh et al. .......... 370/312
2014/0133337 A1   5/2014 Lee et al.

FOREIGN PATENT DOCUMENTS

| | | |
|---|---|---|
| JP | 2011-009866 A | 1/2011 |
| JP | 2011-142550 A | 7/2011 |
| JP | 2012-039168 A | 2/2012 |
| JP | 2012-138967 A | 7/2012 |
| WO | 2005/055462 A1 | 6/2005 |
| WO | 2011/018906 A1 | 2/2011 |
| WO | 2013/009052 A2 | 1/2013 |
| WO | 2013/120265 A1 | 8/2013 |

OTHER PUBLICATIONS

Fujitsu, "Enhancement of existing mechanism for operational carrier selection," 3GPP TSG-RAN WG3 #76, R3-121306, 3 pages, May 2012.

Fujitsu, "Signalling enhancement for the operational carrier selection," 3GPP TSG-RAN WG3 #75bis, R3-120640, 3 pages, Mar. 2012.

UK Search and Examination Report mailed on Jan. 30, 2014 for UK Patent Application No. 1315301.0, filed Aug. 28, 2013 (6 pages).

Japanese Office Action mailed on Jul. 29, 2014 for Japanese Application No. 2013-178248, filed Aug. 29, 2013, with English translation (8 pages).

* cited by examiner

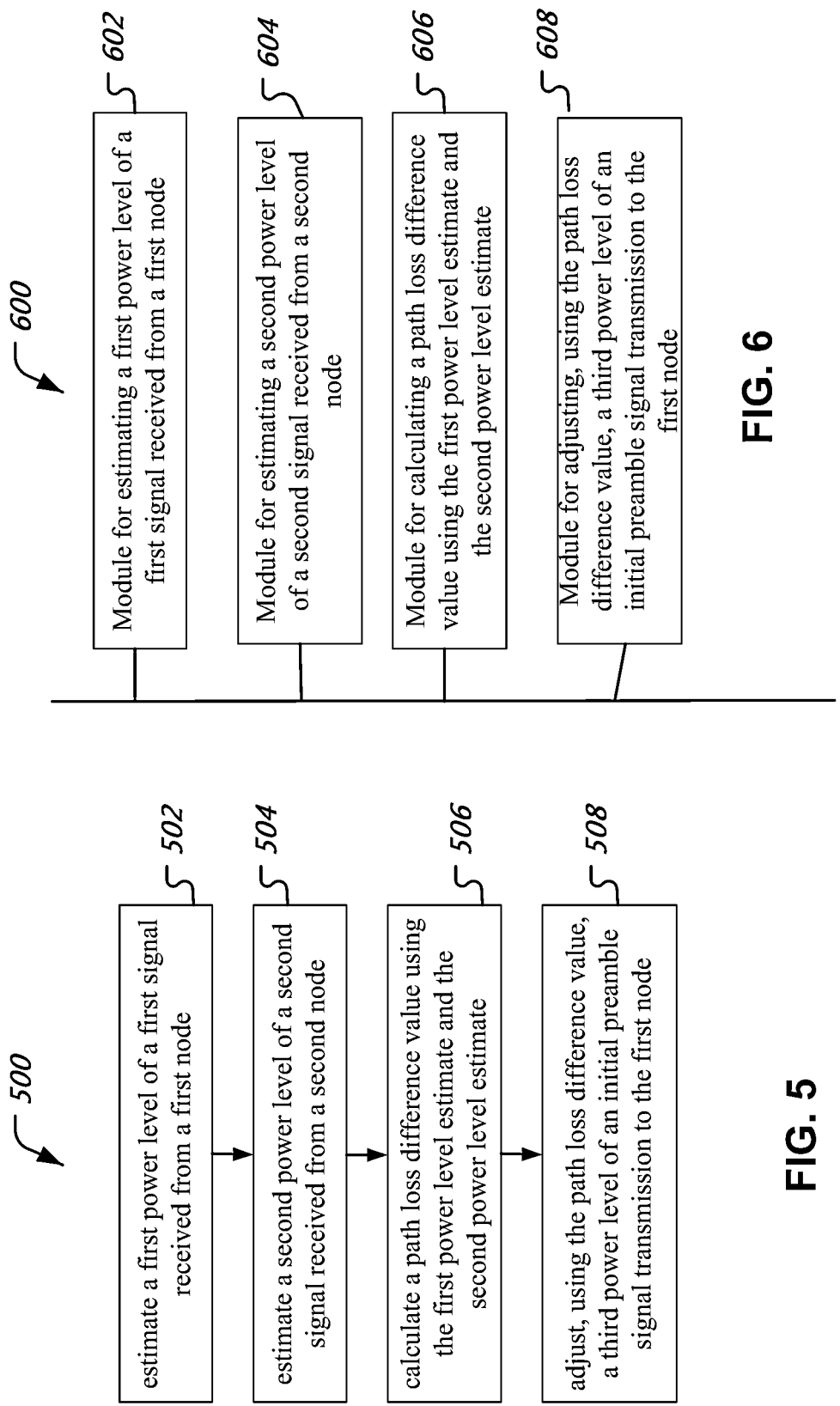

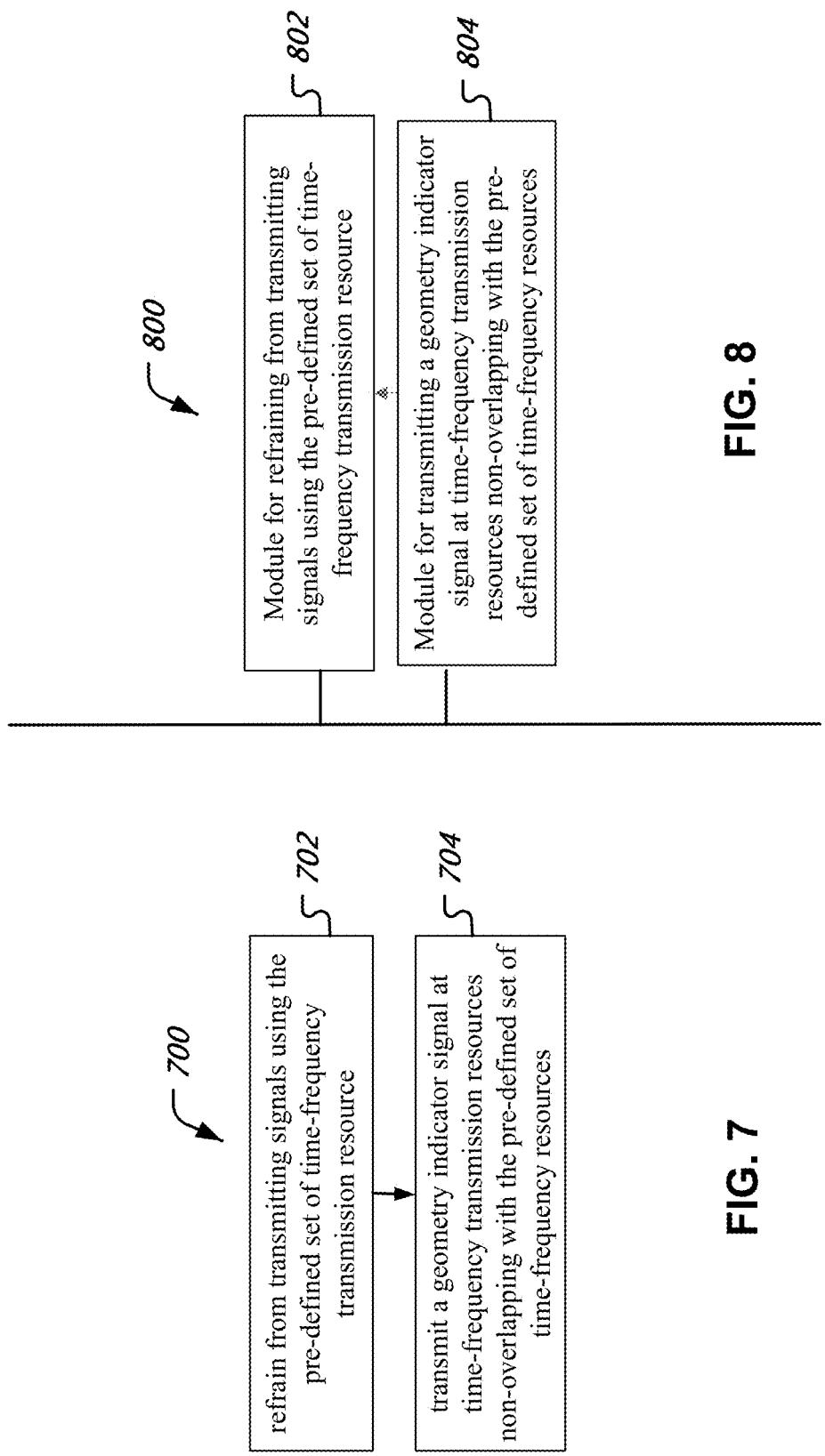

METHODS AND APPARATUS FOR USING A GEOMETRY INDICATOR IN HETNET DEPLOYMENTS

CROSS REFERENCE TO RELATED APPLICATIONS

This patent application claims the benefit of International Patent Application No. PCT/CN2012/080802, filed Aug. 30, 2012. The entire content of the before-mentioned patent application is incorporated by reference as part of the disclosure of this application.

BACKGROUND

This document relates to cellular telecommunication systems, especially to a heterogeneous network where one or more low-power nodes are deployed in a macro base station's coverage.

Cellular communication systems are being deployed all over the world to provide not only voice services, but also mobile broadband data and multimedia services. There is an ever-growing need for higher bandwidth because new mobile applications are continuously being released that consume higher and higher amount of data, e.g., for video and graphics. As mobile system operators deploy these bandwidth-hungry applications and increase the geographic areas covered by broadband mobile services, there is an ongoing need to cover every square inch of an operator's coverage area with high bandwidth connectivity.

As the spectrum efficiency for the point-to-point link already approaches its theoretical limit, one way is to split big cells into smaller and smaller cells. When the cell becomes closer to each other, the adjacent cell interferences become more severe, the cell splitting gain saturates. Furthermore, nowadays it is more and more difficult to acquire new sites to install base stations for the operators and the costs are also higher and higher. Therefore, cell-splitting cannot fulfill the bandwidth demands.

Improvements to the operation of cellular wireless networks are needed.

SUMMARY

This document describes technologies, among other things, for enabling improved co-existence of low power nodes and macro base stations in a heterogeneous network deployment.

In one aspect, methods, systems and apparatus are disclosed for estimating a first power level of a first signal received from a first node, estimating a second power level of a second signal received from a second node, calculating a path loss difference value using the first power level estimate and the second power level estimate and adjusting, using the path loss difference value, a third power level of an initial preamble signal transmission to the first node.

In another aspect, methods, systems and apparatus are disclosed for implementation in a heterogeneous network that includes at least one macro node configured to transmit a synchronization signal in a pre-defined set of time-frequency transmission resources, including refraining from transmitting signals using the pre-defined set of time-frequency transmission resource and transmitting a geometry indicator signal at time-frequency transmission resources non-overlapping with the pre-defined set of time-frequency resources, wherein the geometry indicator signal is transmitted at a power level lower than that of the synchronization signal and wherein the geometry indicator signal carries a transmitting node identification.

In yet another aspect, a heterogeneous wireless system is disclosed. The system includes a macro base station, a micro (low power node LPN) base station and a user equipment (UE). The macro base station is configured to transmit synchronization signals using a first set of transmission resources. The micro base station is configured to refrain from transmissions in the first set of transmission resources. The micro base station transmits a geometry indicator signal in a second set of transmission resources that share at least some OFDM symbols with the first set of transmission resources. The UE is configured to receive the synchronization signal and the geometry indicator signal and calculate a path loss difference that is used to back-off power of an initial transmission preamble (e.g., during random access procedure) to the macro base station.

These and other aspects, and their implementations and variations are set forth in the drawings, the description and the claims.

BRIEF DESCRIPTION OF THE DRAWINGS

FIG. 5 is a flow chart representation of a process of facilitating operation of a low power network node.

FIG. 6 is a block diagram representation of a wireless network apparatus.

FIG. 7 is a flow chart representation of a process of wireless communications.

FIG. 8 is a block diagram representation of a wireless network apparatus.

Like reference symbols in the various drawings indicate like elements.

DETAILED DESCRIPTION

The techniques disclosed in this document, in one aspect, improve the operation of a heterogeneous network (HetNet) by facilitating controlling power of signal transmission from a user equipment (UE) by transmitting to the UE signals that allow the UE to estimate a geometry of deployment (e.g., how close a low power node is to the UE, compared to the macro cell base station).

Recently, a new type of network deployment so-called HetNet (Heterogenous Network) is proposed and attracts a lot of interests and efforts in the industry. In HetNet, another tier consisting of multiple low-power nodes, or micro base stations, is added onto the existing macro base stations coverage area. In some configurations, the macro base station works as a master and the low power nodes work as slaves (e.g., follow transmission schedule controlled by the master) in order to have better interference managements and resource allocation etc.

Figure 1:
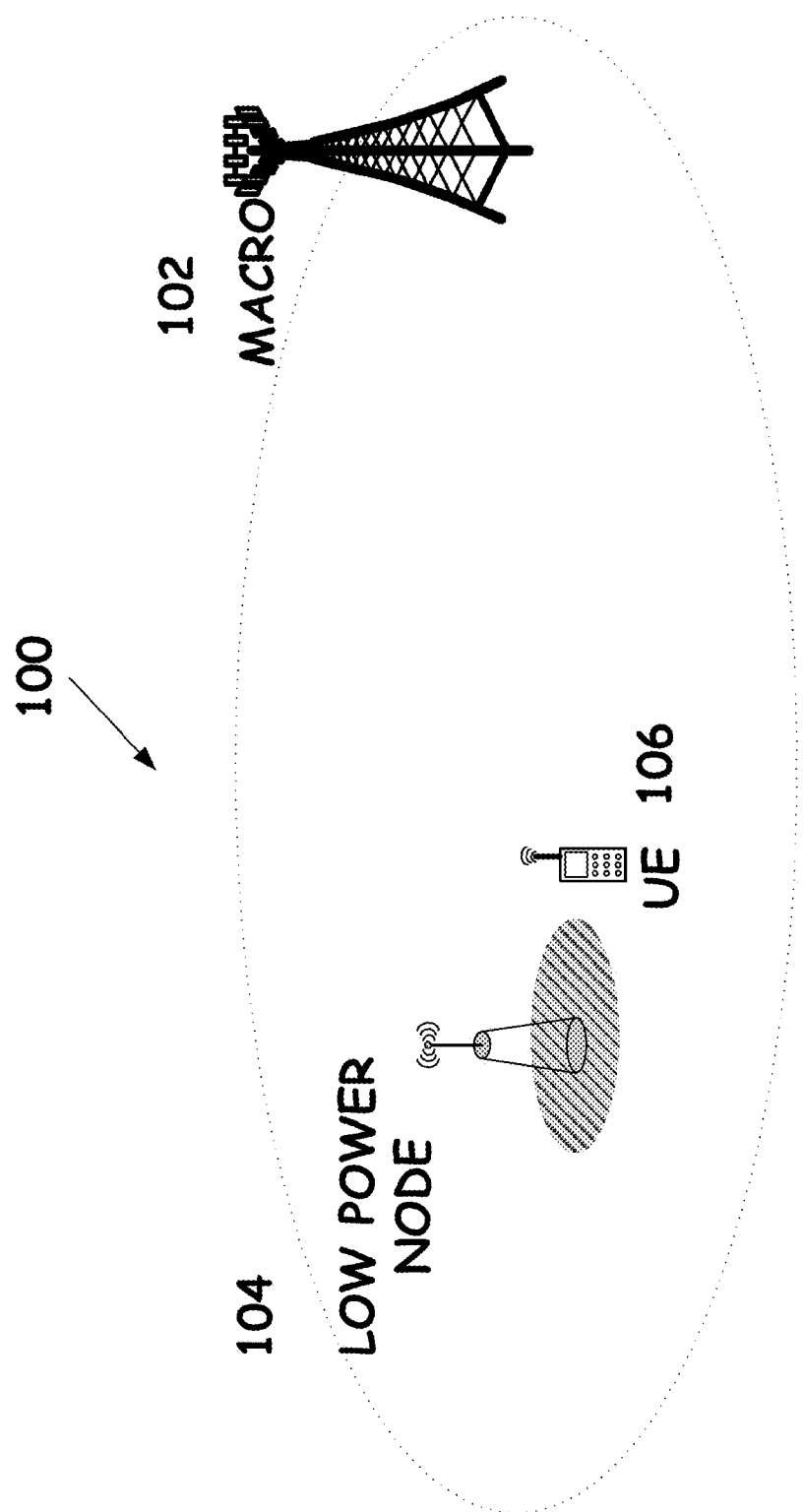
FIG. 1 depicts a wireless HetNet deployment scenario.

FIG. 1 shows a typical HetNet deployment 100 that includes a macro base station 102, a low power node 104 and a UE 106. In HetNet deployment, if a UE 106 is close to one low power node 104, its uplink transmit power may be unnecessarily high before it establishes a connection with the network and lowers its transmit power by uplink power control loop. On one hand, this unnecessary high transmit power generates the uplink co-channel interferences thus introduces certain detriments to the uplink capacity. On the other hand, this unnecessary high transmit power might reduce the performance or even block the receive chain completely at the low power node which it is close to.

In the present document, a geometry indicator is disclosed to help a UE 106 to find out its approach to one low power node to which it is close. The geometry indicator is only transmitted by the low power nodes, and the macro base station does not transmit the indicator. The UE 106 detects the geometry indicator at the same time when it performs synchronization to the network. As a detection result, both the received synchronization channel from the macro station 102 and the received geometry indicator from low power nodes 104 are measured after the UE 106 is synchronized to the network. Thus the power difference can be measured between the geometry indicator and the synchronization channels. Then a path-loss difference is obtained by compensating the measured power difference with a broadcast parameter which shows the transmit power difference between the synchronization channel and the geometry indicator.

The path-loss difference can be used by the UE 106 afterwards, for example, to set the transmit power back-off when it starts to send PRACH (physical random access channel) preamble, or to set the transmit power back-off when it sends SRS (sounding reference signal) symbols, etc.

The path-loss difference measured by the UE 106 can also be reported to the macro base station 102 in different configurations, for example, actively, periodically or at the request from the macro base station. The macro base station 102 uses the reported path-loss difference as an auxiliary information to the scheduler, e.g., to determine which UE 106 should be served etc.

Example embodiments using Long Term Evolution (LTE) deployment scenarios are discussed, but the scope of the disclosed techniques is not limited to LTE, and it can be used in other types of cellular HetNet communication systems. Furthermore, the terms used in this specification are generally consistent with their usage in the currently published versions of 3GPP documents TS 36.211 (version 10.5) and TS 36.212 (version 10.6), the relevant portions of which are incorporated in this document by references.

Figure 2:
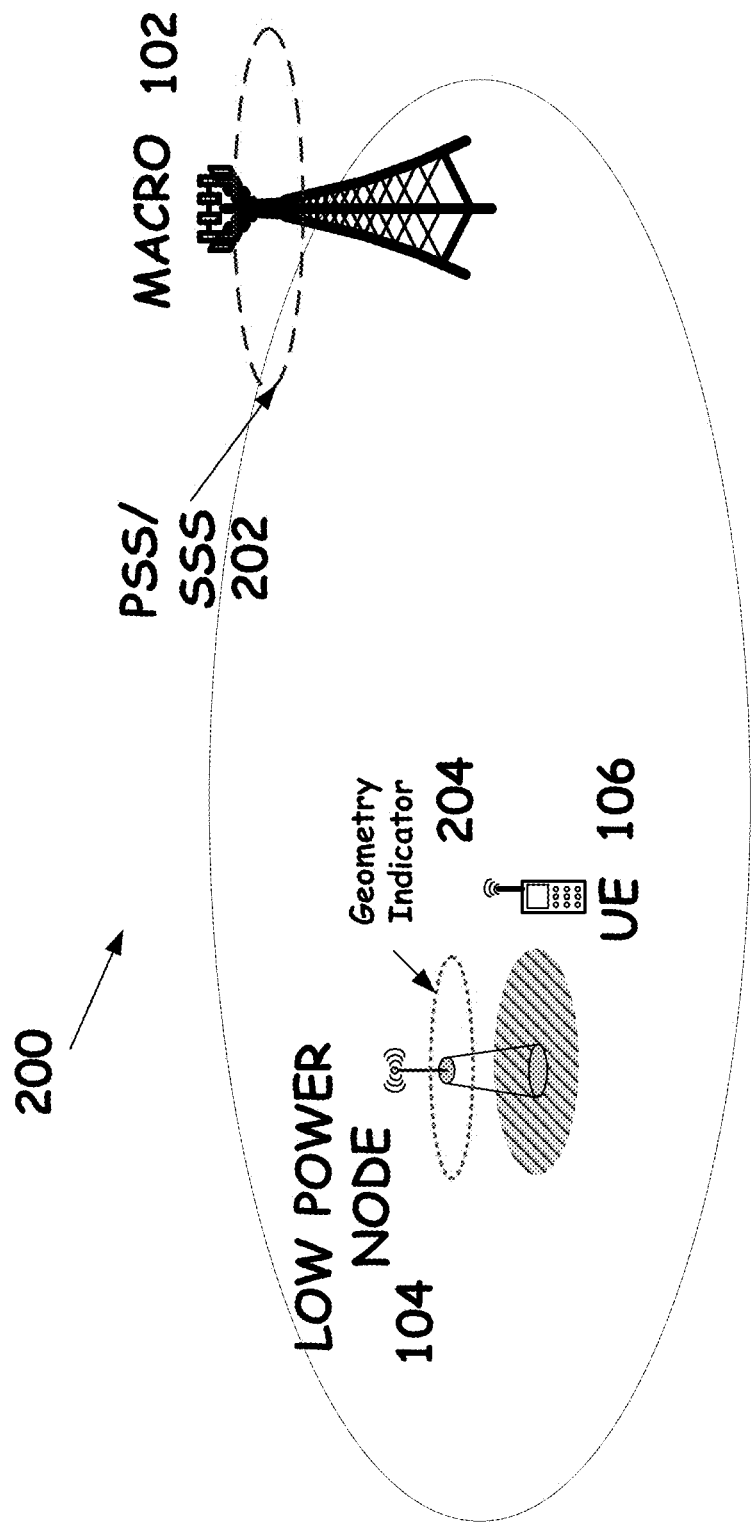
FIG. 2 depicts a wireless HetNet deployment that uses a geometry indicator.

With reference to FIG. 2, the operation of a HetNet 200 that uses a geometry indicator is disclosed.

(1) Primary synchronization signal and secondary synchronization signal (PSS/SSS) 202 is transmitted only by the macro base station 106 as normally, but not in the low power nodes 104. For example, in LTE networks, PSS/SSS 202 is located at slot 0 and slot 10 respectively in one radio frame;

(2) Geometry Indicator 204 is only transmitted by the low power nodes 104:

One embodiment example is as follows:

Sequence

1) Only one sequence indicating the geometry indicator for all LPNs 104. And the geometry indicator could be a predefined 32-bit sequence. For example, one of the control frame indicator (CFI) sequences can be reused as the geometry indicator, for example, the first CFI sequence:

<0,1,1,0,1,1,0,1,1,0,1,1,0,1,1,0,1,1,0,1,1,0,1,1,0,1,1,0, 1,1,0,1>            Eq (1)

2) There are several predefined sequences and each sequence corresponds to the LPN ID or group ID. For example, all of the CFI sequences can be reused as the geometry indicator.

Time-frequency Plane Location

In LTE, in one radio frame (10 ms), there are 20 Resource Elements (REs) unused at the same orthogonal frequency domain multiplexing (OFDM) symbols as PSS and SSS 202 located. Therefore 16 REs of them is used for the geometry indicator 204. And in order to have less impact on the synchronization channels, the rest 4 REs are used to separate geometry indicator and the synchronization channels. This arrangement is depicted in FIG. 3.

Figure 3:
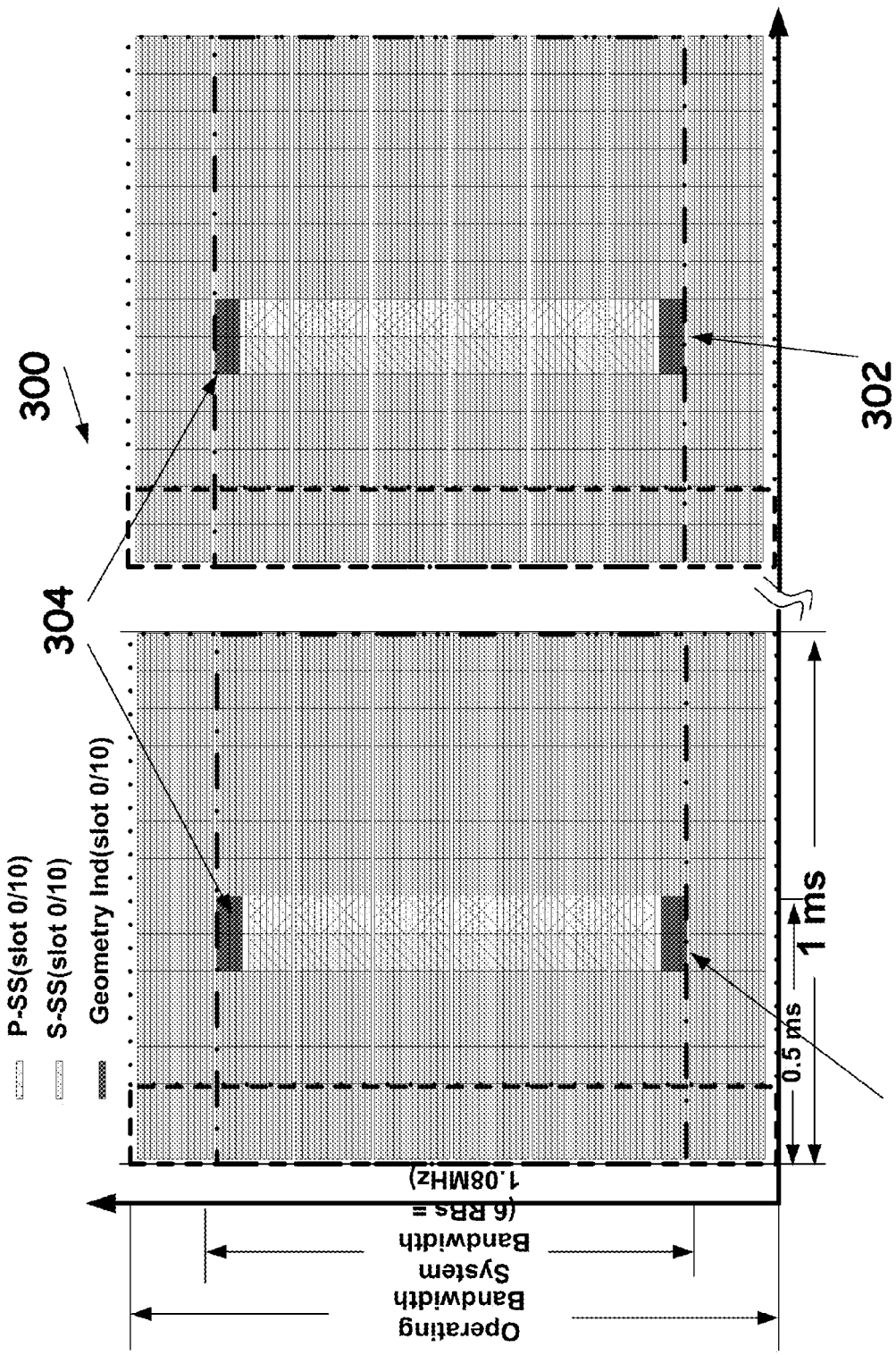
FIG. 3 depicts a transmission resource allocation graph in which certain resource elements (REs) are assigned to transmission of a Geometry Indicator signal.

With reference to FIG. 3, REs are plotted along time axis (horizontal) and frequency axis (vertical) with RE group 302 and 304 showing the unused subcarriers in OFDM symbols used by primary and secondary synchronization signals.

Figure 4:
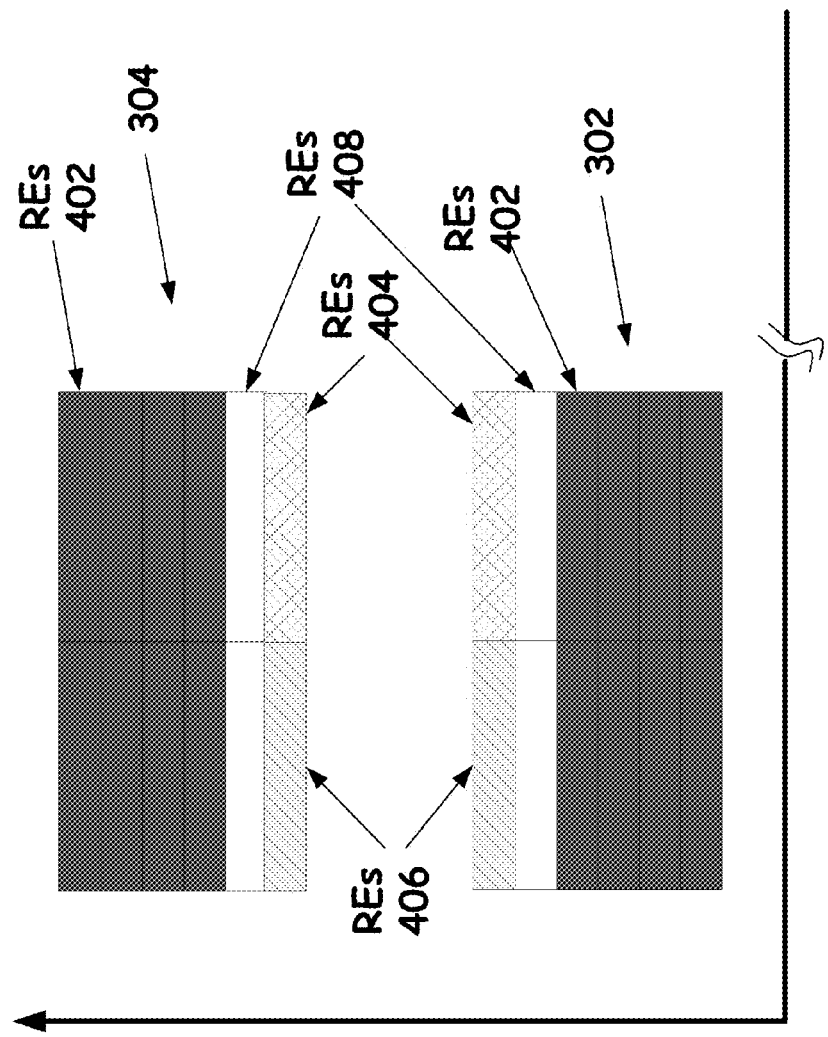
FIG. 4 depicts the allocation of REs to Geometry Indicator signal transmissions.

FIG. 4 shows an enlarged view of RE groups 302 and 304. REs 402 correspond to the REs usable by geometry indicator signals. REs 404 are used by PSS and REs 406 are used by SSS. REs 408 can be optionally used to provide separation between PSS/SSS and geometry signal transmissions. In one beneficial aspect, REs 408 help mitigate any backward compatibility issue with UEs that are expecting no energy transmission in the REs 402.

Modulation

The 32-bit sequence is QPSK modulated to be carried on the 16 REs.

Another embodiment example is:

The geometry factor carries L bits LPN ID. The L-bit LPN ID is at first encoded into M bits, then M bits are modulated into Q symbols, and the Q symbols are finally mapped to Q physical REs whose relative positions to PSS/SSS are fixed and known by UEs.

(3) UE performs the synchronization as normally (4) When UE obtains the synchronization to the found cell, it detects/decodes the geometry indicator at the same OFDM symbols as the found synchronization channels.

(5) UE measures the power difference $\Delta P_{SG} = P_{rx\_Synch}$ between the synchronization channels and the geometry indicator.

(6) UE reads MIB and other SIBs to get the transmit power difference between the synchronization channels and geometry indicator $T_{SG} = P_{Synch} - P_{GI}$ (7) UE calculates the path-loss difference $\Delta PL_{ml} = PL_{macro} - PL_{LFN}$ as:

$$\Delta PL_{ml} = (P_{Synch} - P_{rx\_Synch}) - (P_{GI} - P_{rx\_GI}) \quad\quad \text{Eq (2)}$$
$$= (P_{Synch} - P_{GI}) + (P_{rx\_GI} - P_{rx\_Synch})$$
$$= T_{SG} + \Delta P_{SG}$$

(8) The path-loss difference $\Delta PL_{ml}$ is used for lower the initial preamble transmit power and SRS symbol transmit power etc.

(9) The measured path-loss difference can be sent to the network actively, periodically or at the request by the network. For example, the path-loss difference can be an auxiliary input to the network for locating the UE.

(10) UE can also report the decoded LPN ID to the network actively, periodically or at the request by the network. For example, the LPN ID can be an auxiliary input to the network for locating the UE.

In some implementations, multiple LPNs may coordinate with each other to form a group that is represented by a group ID. These LPNs may coordinate to transmit an identical geometry indicator signal in the REs 402 using the shared group ID for identification. The power of geometry indicator signal may be adjusted downwards so that the additive effect of transmissions from all LPNs at the UE does not exceed a pre-determined threshold.

In a typical deployment scenario, the LPNs may be deployed to facilitate the operation of a UE in a range between 1 meter to 40 meters. In typical deployment scenarios, based on the path characteristics, UE operation may result in a 20 dB to 6 dB backoff in power from the peak random access preamble transmission power.

FIG. 5 is a flow chart representation of a process 500 for operating a wireless device in a wireless network. At 502, a first power level of a first signal received from a first node is estimated. For example, in some embodiments, the first signal may include synchronization signals, such as the above-discussed primary and secondary synchronization signals. At 504, a second power level of a second signal received from a second node is estimated. The second signal may correspond to, for example, geometry indicator signal transmitted by an LPN. At 506, a path loss difference value is calculated using the first power level estimate and the second power level estimate. The path loss difference value may be calculated, e.g., as discussed with respect to Eq. (2). At 508, using the path loss difference value, a third power level of an initial preamble signal transmission to the first node is adjusted. As previously discussed the adjustment could typically in the 6 dB to 30 dB range. For example, as discussed above, the path loss difference value is used to lower the initial preamble transmit power. Optionally, the path-loss difference value may be communicated to the first node on a periodic or on-demand basis.

FIG. 6 is a block diagram representation of an apparatus 600 operable in a heterogeneous wireless network. The module 602 is for estimating a first power level of a first signal received from a first node. The module 604 is for estimating a second power level of a second signal received from a second node. The module 606 is for calculating a path loss difference value using the first power level estimate and the second power level estimate. The module 608 is for adjusting, using the path loss difference value, a third power level of an initial preamble signal transmission to the first node. The apparatus 600 and modules 602, 604, 606 and 608 may further be configured to implement one or more of the disclosed techniques.

FIG. 7 is a flow chart representation of a process 700 of wireless communications for implementation in a heterogeneous network that includes at least one macro node configured to transmit a synchronization signal in a pre-defined set of time-frequency transmission resources. At 702, no transmission of signals at time-frequency transmission resources non-overlapping with the pre-defined set of time-frequency resources is performed. In other words, operation of a node is controlled such that no RF energy is radiated at these resources. For example, as discussed above, an LPN may be operated to refrain from transmitting PSS/SSS signals. At 704, a geometry indicator signal is transmitted at time-frequency transmission resources non-overlapping with the pre-defined set of time-frequency resources. As disclosed with respect to FIGS. 3 and 4, the REs used for geometry indicator signal transmissions may occupy the same OFDM symbols as PSS/SSS. There may be a separation (i.e., REs on which no signals are transmitted) to facilitate backward compatibility. The geometry indicator signal is transmitted at a power level lower than that of the synchronization signal. The geometry indicator signal carries a transmitting node identification.

FIG. 8 is a block diagram representation of a portion of a wireless communication apparatus for operation in a heterogeneous network that includes at least one macro node configured to transmit a synchronization signal in a pre-defined set of time-frequency transmission resources. The module 802 is for refraining from transmitting signals using the pre-defined set of time-frequency transmission resource. The module 804 is for estimating a second power level of a second signal received from a second node. A path loss difference value is calculated using the first power level estimate and the second power level estimate. Using the path loss difference value, a third power level of an initial preamble signal transmission to the first node is adjusted. The apparatus 800 and modules 802, 804, may further be configured to implement one or more of the disclosed techniques.

It will be appreciated that various techniques are disclosed for improved operation of macro and micro (low power) nodes in a heterogeneous network are disclosed.

It will further be appreciated that the disclosed techniques enable backoff of uplink power transmission, based on downlink signal powers received from two different base stations. The received signals may occupy non-overlapping REs on same OFDM symbols within a transmission frame, with optional separation between the REs.

It will further be appreciated that the geometry indicator signal can be designed to allow low power nodes to indicate their identities or identities of groups to which they belong, by coding the geometry indicator signal using a code. The use of a code such as the CFI helps reduce complexity because UEs already generate CFI codes for other operations in LTE.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of wireless communications for implementation in a heterogeneous network that includes at least one macro node configured to transmit a synchronization signal in a pre-defined set of time-frequency transmission resources, the method comprising:
    refraining from transmitting signals using the pre-defined set of time-frequency transmission resource; and
    transmitting a geometry indicator signal at time-frequency transmission resources non-overlapping with the pre-defined set of time-frequency resources;
    wherein the geometry indicator signal is transmitted at a power level lower than that of the synchronization signal, and
    wherein the geometry indicator signal carries a transmitting node identification;
    wherein the transmitting node identification is encoded using a control frame indicator (CFI) sequence.

2. The method of claim 1, wherein the time-frequency transmission resources for the geometry indicator use orthogonal frequency domain multiplexing (OFDM) symbols used by the pre-defined set of time-frequency transmission resources.

3. The method of claim 1, wherein the transmitting node identification comprises a group identification.

4. A wireless communication apparatus for operation in a heterogeneous network that includes at least one macro node configured to transmit a synchronization signal in a pre-defined set of time-frequency transmission resources, the apparatus comprising:
    a controller that refrains from transmitting signals using the pre-defined set of time-frequency transmission resource; and
    a transmitter that transmits a geometry indicator signal at time-frequency transmission resources non-overlapping with the pre-defined set of time-frequency resources;
    wherein the geometry indicator signal is transmitted at a power level lower than that of the synchronization signal, and
    wherein the geometry indicator signal carries a transmitting node identification;
    wherein the transmitting node identification is encoded using a control frame indicator (CFI) sequence.

5. The apparatus of claim 4, wherein the time-frequency transmission resources for the geometry indicator use orthogonal frequency domain multiplexing (OFDM) symbols used by the pre-defined set of time-frequency transmission resources.

6. The apparatus of claim 4, wherein the transmitting node identification comprises a group identification.

7. A non-transitory, processor-readable medium having processor-executable instructions stored thereon, the instructions, when executed, causing a processor to facilitate operation of a micro node in a heterogeneous network that includes at least one macro node configured to transmit a synchronization signal in a pre-defined set of time-frequency transmission resources, the instructions comprising:
    instructions for refraining from transmitting signals using the pre-defined set of time-frequency transmission resource; and
    instructions for transmitting a geometry indicator signal at time-frequency transmission resources non-overlapping with the pre-defined set of time-frequency resources;
    wherein the geometry indicator signal is transmitted at a power level lower than that of the synchronization signal, and
    wherein the geometry indicator signal carries a transmitting node identification;
    wherein the transmitting node identification is encoded using a control frame indicator (CFI) sequence.

8. A wireless communication apparatus for operation in a heterogeneous network that includes at least one macro node configured to transmit a synchronization signal in a pre-defined set of time-frequency transmission resources, the apparatus comprising:

means for refraining from transmitting signals using the pre-defined set of time-frequency transmission resource; and means for transmitting a geometry indicator signal at time-frequency transmission resources non-overlapping with the pre-defined set of time-frequency resources;

wherein the geometry indicator signal is transmitted at a power level lower than that of the synchronization signal, and wherein the geometry indicator signal carries a transmitting node identification;

wherein the transmitting node identification is encoded using a control frame indicator (CFI) sequence.

\* \* \* \* \*